United States Patent
Lei et al.

(10) Patent No.: US 12,185,307 B2
(45) Date of Patent: Dec. 31, 2024

(54) METHODS AND APPARATUSES FOR MULTIPLE PUSCH TRANSMISSIONS ON UNLICENSED SPECTRUM

(71) Applicant: Lenovo (Beijing) Ltd., Beijing (CN)

(72) Inventors: Haipeng Lei, Haidian District (CN); Alexander Golitschek Edler von Elbwart, Darmstadt (DE); Joachim Löhr, Wiesbaden (DE)

(73) Assignee: Lenovo (Beijing) Ltd., Beijing (CN)

( * ) Notice: Subject to any disclaimer, the term of this patent is extended or adjusted under 35 U.S.C. 154(b) by 359 days.

(21) Appl. No.: 17/773,831

(22) PCT Filed: Nov. 15, 2019

(86) PCT No.: PCT/CN2019/118808
§ 371 (c)(1),
(2) Date: May 2, 2022

(87) PCT Pub. No.: WO2021/092902
PCT Pub. Date: May 20, 2021

(65) Prior Publication Data
US 2022/0408461 A1 Dec. 22, 2022

(51) Int. Cl.
*H04W 72/12* (2023.01)
*H04W 72/1268* (2023.01)
(Continued)

(52) U.S. Cl.
CPC ....... *H04W 72/1268* (2013.01); *H04W 72/23* (2023.01); *H04W 74/0808* (2013.01)

(58) Field of Classification Search
CPC ............. H04W 72/1268; H04W 72/23; H04W 74/0808
See application file for complete search history.

(56) References Cited

U.S. PATENT DOCUMENTS

2016/0183296 A1* 6/2016 Yerramalli .......... H04W 74/004
370/329
2018/0368172 A1* 12/2018 Li ....................... H04W 72/23
(Continued)

FOREIGN PATENT DOCUMENTS

CN 108781362 A 11/2018
CN 108886447 A 11/2018
(Continued)

OTHER PUBLICATIONS

Intel Corporation, "Enhancements to configured grants for NR-unlicensed", 3GPP TSG RAN WG1 Meeting #98bis, R1-1910643, Chongqing, China [retrieved Jun. 15, 2022]. Retrieved from the Internet <https://www.3gpp.org/ftp/TSG_RAN/WG1_RL1/TSGR1_98b/Docs/>, Oct. 2019, 14 pages.
(Continued)

*Primary Examiner* — Jamal Javaid
(74) *Attorney, Agent, or Firm* — FIG. 1 Patents

(57) ABSTRACT

Embodiments of the present disclosure relate to methods and apparatuses for multiple physical uplink shared channel (PUSCH) transmissions on unlicensed spectrum. According to an embodiment of the present disclosure, a method performed by a user equipment for wireless communication includes: receiving, from a base station, one or more signals allocating a plurality of PUSCHs for transmitting uplink data, wherein the plurality of PUSCHs are contiguous in time domain; dividing the plurality of PUSCHs into a first set of PUSCHs and a second set of PUSCHs, and further dividing the uplink data into a first part of the uplink data and a second part of the uplink data, wherein, the first set of PUSCHs is used for transmitting the first part of the uplink data and the second set of PUSCHs is used for transmitting the second part of the uplink data; performing at least one channel access procedure for transmitting the first part of the
(Continued)

uplink data using the first set of PUSCHs and the second part of the uplink data using the second set of PUSCHs.

20 Claims, 10 Drawing Sheets

(51) Int. Cl.
    *H04W 72/23*     (2023.01)
    *H04W 74/0808*     (2024.01)

(56) References Cited

U.S. PATENT DOCUMENTS

| | | |
|---|---|---|
| 2019/0068268 A1 | 2/2019 | Zhang et al. |
| 2019/0246411 A1 | 8/2019 | Kim et al. |
| 2019/0306801 A1* | 10/2019 | Zhou .................... H04W 52/04 |

FOREIGN PATENT DOCUMENTS

| | | |
|---|---|---|
| CN | 109644485 A | 4/2019 |
| CN | 110235401 A | 9/2019 |
| WO | 2019027297 A1 | 2/2019 |

OTHER PUBLICATIONS

PCT/CN2019/118808, "International Preliminary Report on Patentability", PCT Application No. PCT/CN2019/118808, May 27, 2022, 5 pages.
PCT/CN2019/118808, "International Search Report and Written Opinion", PCT Application No. PCT/CN2019/118808, Aug. 18, 2020, 6 pages.
201980102205, "Foreign Office Action", CN Application No. 201980102205, May 17, 2024, 22 pages.
Mediatek Inc., "On Channel Access Procedure", 3GPP TSG RAN WG1 #96bis, R1-1904482, Xi'an, China, Apr. 2019, 13 pages.
Nokia, "CAPC for configured grant and dynamic grant", 3GPP TSG-RAN WG2 Meeting #107bis, R2-1913290, update of R2-1910093/R2-1910094, Chongqing, China [https://www.3gpp.org/ftp/tsg_ran/WG2_RL2/TSGR2_107bis/Docs], Oct. 2019, 4 pages.
201980102205.1, "Foreign Office Action", CN Application No. 201980102205.1, Sep. 18, 2024, 14 pages.
Tong, Wu, "Research on hierarchical optimization methods for VOLTE packet loss problem", J-Global ID: 201902234493146363 Reference No. 19A0765191, 2018, 5 pages.

* cited by examiner

METHODS AND APPARATUSES FOR MULTIPLE PUSCH TRANSMISSIONS ON UNLICENSED SPECTRUM

TECHNICAL FIELD

The present disclosure relates to wireless communications, and more particularly, to methods and apparatuses for multiple physical uplink shared channel (PUSCH) transmissions on unlicensed spectrum.

BACKGROUND

Base stations (BSs) and user equipment (UE) may operate in both licensed and unlicensed spectrum. In Long Term Evolution (LTE) Rel-15 Further enhanced Licensed Assisted Access (FeLAA), Autonomous Uplink (AUL) transmission is supported for unlicensed spectrum. In this way, UE can perform the PUSCH transmission on the configured time-frequency resources without waiting for an uplink (UL) grant from the BS. Also, the BS can avoid transmitting a UL grant and performing a channel access procedure for transmitting the UL grant.

To improve the utilization of radio resource, a UE-initiated channel occupancy time (COT) for AUL transmission can be shared with a BS for downlink (DL) transmission (also named "UL-to-DL sharing"), and a BS-initiated COT can also be shared with a UE for UL transmission (also named "DL-to-UL sharing").

SUMMARY OF THE DISCLOSURE

It is desirable to provide a solution for sharing the COT in 5G new radio (NR) network.

According to an embodiment of the present disclosure, a method performed by a UE for wireless communication includes: receiving, from a BS, one or more signals allocating a plurality of PUSCHs for transmitting uplink data, wherein the plurality of PUSCHs are contiguous in time domain; dividing the plurality of PUSCHs into a first set of PUSCHs and a second set of PUSCHs, and further dividing the uplink data into a first part of the uplink data and a second part of the uplink data, wherein, the first set of PUSCHs is used for transmitting the first part of the uplink data and the second set of PUSCHs is used for transmitting the second part of the uplink data; performing at least one channel access procedure for transmitting the first part of the uplink data using the first set of PUSCHs and the second part of the uplink data using the second set of PUSCH.

According to another embodiment of the present disclosure, a method performed by a BS for wireless communication, including: transmitting, to a UE, one or more signals allocating a plurality of PUSCHs for transmitting uplink data, wherein the plurality of PUSCHs are contiguous in time domain; and receiving a first part of the uplink data on a first set of PUSCHs and a second part of the uplink data on a second set of PUSCHs, wherein, the plurality of PUSCHs comprise the first set of PUSCHs and the second set of PUSCHs, and the uplink data comprises the first part of the uplink data and the second part of the uplink data.

According to yet another embodiment of the present disclosure, an apparatus includes: at least one non-transitory computer-readable medium having computer executable instructions stored therein; at least one receiver; at least one transmitter; and at least one processor coupled to the at least one non-transitory computer-readable medium, the at least one receiver, and the at least one transmitter. The computer executable instructions are programmed to implement a method according to any one of the embodiments of the present disclosure, which will be described below, with the at least one receiver, the at least one transmitter, and the at least one processor.

Embodiments of the present disclosure solve issues about BS-initiated COT sharing and UE-initiated COT sharing in NR network, which may facilitate and improve transmissions on unlicensed spectrum.

BRIEF DESCRIPTION OF THE DRAWINGS

In order to describe the manner in which advantages and features of the present disclosure can be obtained, a description of the disclosure is rendered by reference to specific embodiments thereof which are illustrated in the appended drawings. These drawings depict only exemplary embodiments of the present disclosure and are not therefore intended to limit the scope of the present disclosure.

DETAILED DESCRIPTION

The detailed description of the appended drawings is intended as a description of the currently preferred embodiments of the present disclosure, and is not intended to represent the only forms in which the present disclosure may be practiced. It is to be understood that the same or equivalent functions may be accomplished by different embodiments that are intended to be encompassed within the spirit and scope of the present disclosure.

Embodiments provide methods and apparatuses for downlink (DL) or uplink (UL) data transmission on unlicensed spectrum. To facilitate understanding, embodiments are provided under specific network architecture and new service scenarios, such as 3rd Generation Partnership Project (3GPP) 5G network, 3GPP LTE Release 8 and so on. Persons skilled in the art know very well that, with the development of network architecture and new service scenarios, the embodiments in the present disclosure are also applicable to similar technical problems.

Figure 1:
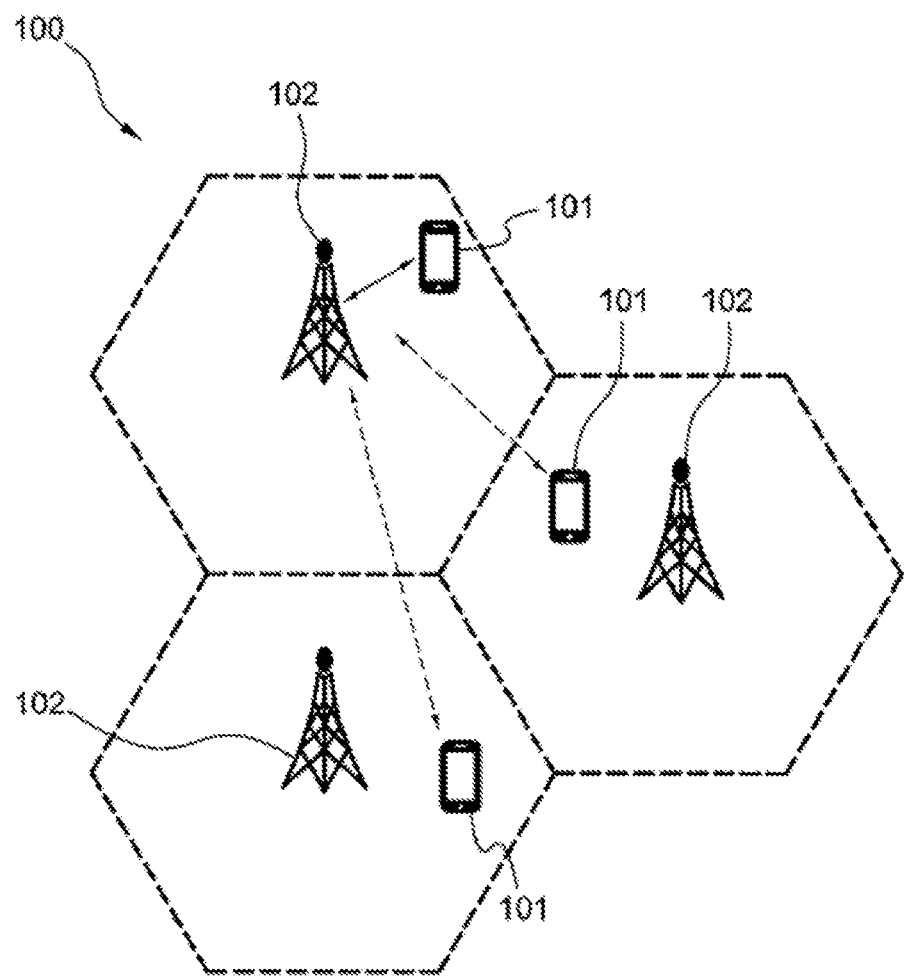
FIG. 1 illustrates a schematic diagram of a wireless communication system according to some embodiments of the present disclosure.

FIG. 1 illustrates a schematic diagram of a wireless communication system 100 according to some embodiments of the present disclosure.

As shown in FIG. 1, the wireless communication system 100 includes UE 101 and BS 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a node-B, an enhanced node B (eNB), a gNB, a home node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3rd generation partnership project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the downlink and the UEs 101 transmit data on the uplink using discrete Fourier transform-spread-orthogonal frequency division multiplexing (DFT-S-OFDM) or cyclic prefix-orthogonal frequency division multiplexing (CP-OFDM) scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

In LTE Rel-15 FeLAA, autonomous uplink (AUL) transmission is supported over unlicensed spectrum, so that not only UE can transmit PUSCHs on the configured time-frequency resources without waiting for an UL grant but also eNB may skip the procedure of listen before talk (LBT) and the procedure of transmitting UL grant. Like semi-persistent scheduling (SPS) transmission, downlink control information (DCI) is needed for activation and deactivation of AUL transmission, and cyclic redundancy check (CRC) of the DCI is scrambled with a specific radio network temporary identity (RNTI), AUL C-RNTI. For AUL transmission, UE transmits AUL-UCI on the associated AUL PUSCH. The AUL-UCI includes 4-bit Hybrid Automatic Repeat Request (HARQ) process identifier (ID), 1 or 2 bits new data indication (NDI) (1 bit for transmission mode 1 (TM1), 2 bits for TM2), 2-bit redundancy version (RV), 16-bit UE-ID, 1-bit PUSCH starting point (indicating symbol 0 or 1), 1-bit PUSCH ending point (indicating symbol 12 or 13), 1-bit COT sharing, 16-bit CRC.

In LTE Rel-15 FeLAA, for AUL transmission, the UE uses a Type-1 channel access procedure (also named "LBT Cat.4 procedure") for transmitting AUL PUSCH and determines the channel access priority class (CAPC) value from Table 4.2.1-1 (reproduced below) in TS37.213 based on the UL traffic data. The CAPC value used for performing the LBT Cat.4 procedure corresponds to a contention window where a random backoff counter is generated. If the UE detects that the channel is idle in an Extended Clear Channel Assessment (ECCA) slot, the counter counts down by 1. If the counter counts down to 0, the LBT Cat.4 procedure is successful and the UE then can start to transmit UL data on the channel. The UE Table 4.1.1-1 (reproduced below) in TS37.213 also lists the channel access priority class for downlink transmission, i.e., the CAPC value used by eNB for performing an LBT Cat.4 procedure before DL transmission. This mechanism is completely under network control since network maps logical channels to channel access priority class values. Moreover, if an AUL PUSCH falls inside of an eNB-initiated COT, whether the AUL PUSCH is allowed to be transmitted inside of the eNB-initiated COT is dependent on a one-bit COT sharing indicator in a common physical data control channel (PDCCH) with CRC scrambled by CC-RNTI.

TABLE 4.1.1-1

Channel Access Priority Class for DL

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 4.2.1-1

Channel Access Priority Class for UL

| Channel Access Priority Class (p) | $m_p$ | $CW_{min,p}$ | $CW_{max,p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcot,p}$ = 10 ms if the higher layer parameter 'absenceOfAnyOtherTechnology-r14' indicates TRUE, otherwise, $T_{ulmcot,p}$ = 6 ms.
NOTE 2:
When $T_{ulmcot,p}$ = 6 ms it may be increased to 8 ms by inserting one or more gaps. The minimum duration of a gap shall be 100 µs. The maximum duration before including any such gap shall be 6 ms.

If the one-bit COT sharing indicator is set to TRUE, then a UE can use a Type-2 channel access procedure (also named "LBT Cat.2 procedure") for the AUL transmission corresponding to any priority class of the UL traffic data. The LBT Cat.2 procedure is one-shot sensing predefined with a minimum sensing interval. If the UE detects that the channel is idle in the minimum sensing interval, the LBT Cat.2 procedure is successful and the UE then can start to transmit UL data on the channel. If the one-bit COT sharing indicator is set to FALSE, then a UE shall not transmit the AUL transmission in the eNB-initiated COT.

Similarly, a UE-initiated COT by performing an LBT Cat.4 procedure for AUL transmission can be also shared with an eNB for DL transmission. This permission of DL transmissions within a UE-initiated COT is indicated to the eNB by a one-bit COT sharing indicator in AUL-UCI. If the one-bit COT sharing indicator is set to TRUE, it implies that the UE intends to share its COT to the eNB for DL transmission. If the one-bit COT sharing indicator is set to FALSE, it implies that the UE does not intend to share its COT to the eNB.

In particular, the COT sharing indicator indicates whether subframe n+X is allowed for DL transmission, wherein n is the subframe number where AUL-UCI is transmitted. X is an integer configured by the eNB as part of AUL RRC configuration, where 1<X<5. If the UE transmits a TRUE COT sharing indicator in AUL-UCI in subframe n, then the UE will stop its AUL PUSCH transmission at symbol 12 in the subframe n+X−1 irrespective of the RRC configured location for the PUSCH ending symbol. Thus, the last symbol in subframe n+X−1 is blanked, so that the eNB can perform LBT for DL transmission in subframe n+X. It should be noted that for DL transmission in the UE-initiated COT, only PDCCH transmission spanning up to 2 symbols at the beginning of the subframe n+X is allowed. This PDCCH can contain Autonomous Uplink-Downlink Feedback Information (AUL-DFI) or a UL grant to any UE. In view of the above, the shared resource is limited and multiple UL-DL switching points are not allowed.

In Rel-16 NR-based access to unlicensed spectrum (NR-U), there are two mechanisms for a UE and a gNB to share the COT with each other, i.e., a gNB-initiated COT can be shared to a UE for scheduled PUSCH transmission and configured grant PUSCH (CG-PUSCH) transmission, and a UE-initiated COT for UL transmission can be shared to a gNB for PDCCH/physical downlink shared channel (PDSCH) transmission.

Figure 2:
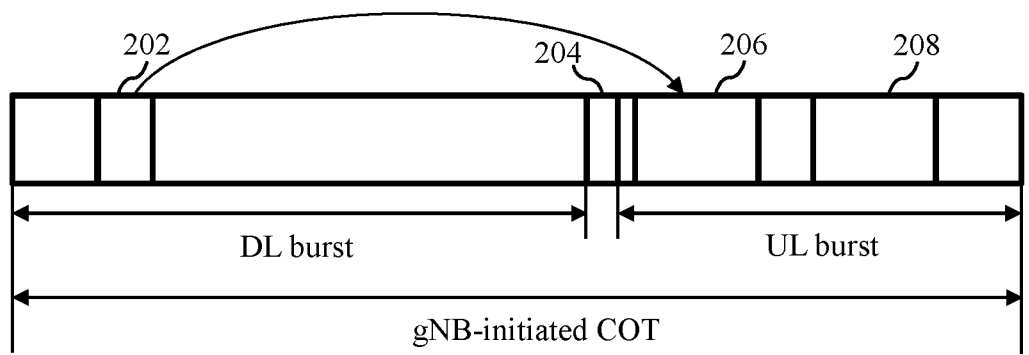
FIG. 2 illustrates a gNB-initiated COT in an NR network according to some embodiments of the present disclosure.

FIG. 2 illustrates a gNB-initiated COT in an NR network according to some embodiments of the present disclosure. A gNB may obtain a gNB-initiated COT after performing an LBT Cat.4 procedure. As depicted in FIG. 2, the gNB-initiated COT includes a DL burst for transmitting DL data and a UL burst which may be shared to a UE for transmitting UL data. A gap 204 (also named "DL-UL offset") between the DL burst and the UL burst is for the UE to perform a channel access procedure such as an LBT Cat.2 procedure. A DCI 202 including a UL grant is transmitted in the DL burst to schedule PUSCH(s) 206 for the UE. The UL burst may also include CG-PUSCH(s) 208, which is configured to the UE by RRC signaling. It should be understood that the locations of DCI 202, gap 204, scheduled PUSCH(s) 206, and CG-PUSCH(s) 208 shown in FIG. 2 are for illustrative purpose only, and not intended to limit the scope of the present disclosure.

Figure 3:
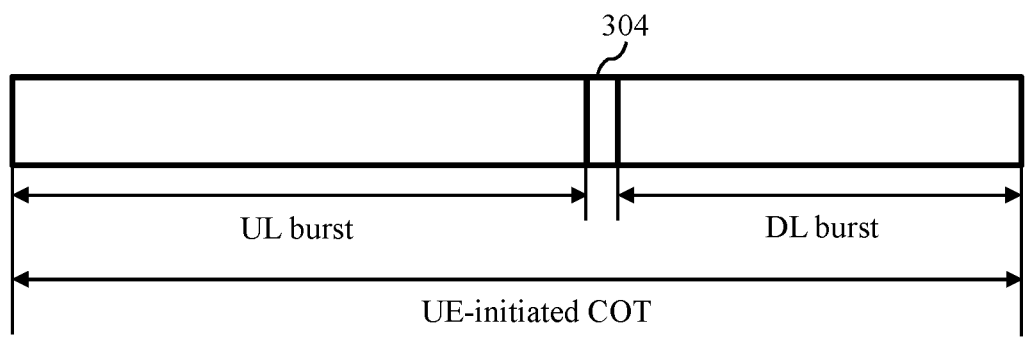
FIG. 3 illustrates a UE-initiated COT in an NR network according to some embodiments of the present disclosure.

FIG. 3 illustrates a UE-initiated COT in an NR network according to some embodiments of the present disclosure. A UE may obtain a UE-initiated COT after performing an LBT Cat.4 procedure. As depicted in FIG. 3, the UE-initiated COT includes a UL burst for transmitting UL data and a DL burst which may be shared to a BS (e.g., gNB) for transmitting DL data. A gap 304 (also named "UL-DL offset") between the UL burst and the DL burst is for the BS to perform a channel access procedure such as an LBT Cat.2 procedure. The UL burst may include scheduled PUSCH(s) and/or CG-PUSCH(s).

Multiple contiguous PUSCH transmissions may be scheduled by one or more UL grants, or be configured by RRC signaling as CG-PUSCHs. There may be possibilities that some of the multiple contiguous PUSCHs are located within a gNB-initiated COT while others of the multiple contiguous PUSCHs are located outside of the gNB-initiated COT, as shown in FIGS. 4-6.

Figure 4:
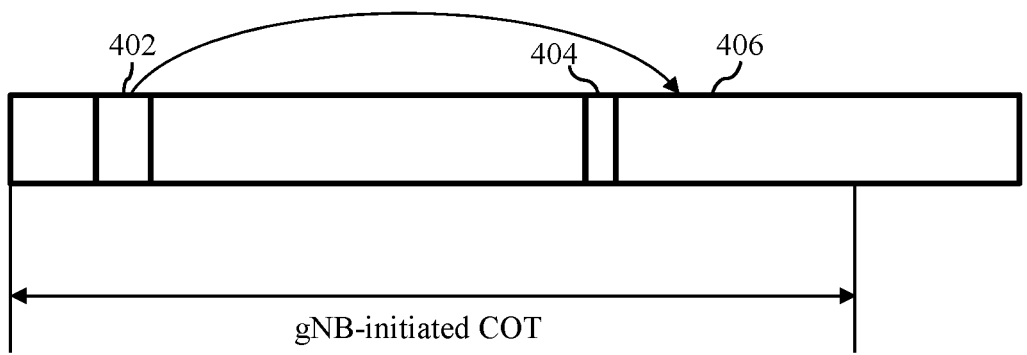
FIG. 4 illustrates multiple contiguous PUSCHs scheduled by a single Downlink Control Information (DCI) according to some embodiments of the present disclosure.

FIG. 4 illustrates multiple contiguous PUSCHs scheduled by a single DCI for a UE according to some embodiments of the present disclosure. As depicted in FIG. 4, DCI 402 schedules a set of PUSCHs 406 following a DL-UL offset 404. The set of PUSCHs 406 include multiple contiguous PUSCHs without any gap in time domain resources. A portion of the set of PUSCHs 406 is located within a gNB-initiated COT while the remainder of the set of PUSCHs 406 is located outside of the gNB-initiated COT.

Figure 5:
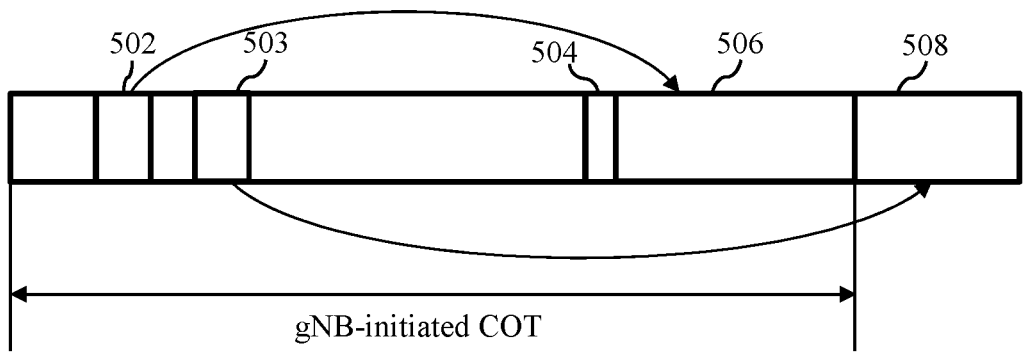
FIG. 5 illustrates multiple contiguous PUSCHs scheduled by more than one piece of DCI according to some embodiments of the present disclosure.

FIG. 5 illustrates multiple contiguous PUSCHs scheduled by more than one DCI for a UE according to some embodiments of the present disclosure. As depicted in FIG. 5, DCI 502 schedules a first set of PUSCHs 506 following a DL-UL offset 504, and DCI 503 schedules a second set of PUSCHs 508 following the first set of PUSCHs 506. Each set includes one or more PUSCHs without any gap in time domain resources, and there is no gap between the two sets. Although only two DCI are illustrated in FIG. 5, one skilled in the art will recognize that more DCI may be received by a UE and similar procedures may be adopted. Although FIG. 5 illustrates that the first set of PUSCHs 506 is located within a gNB-initiated COT while the second set of PUSCHs 508 is located outside of the gNB-initiated COT, a portion of the first set of PUSCHs 506 may be located outside of the gNB-initiated COT, or a portion of the second set of PUSCH 508 may be located within the gNB-initiated COT, according to some other embodiments of the present disclosure.

Figure 6:
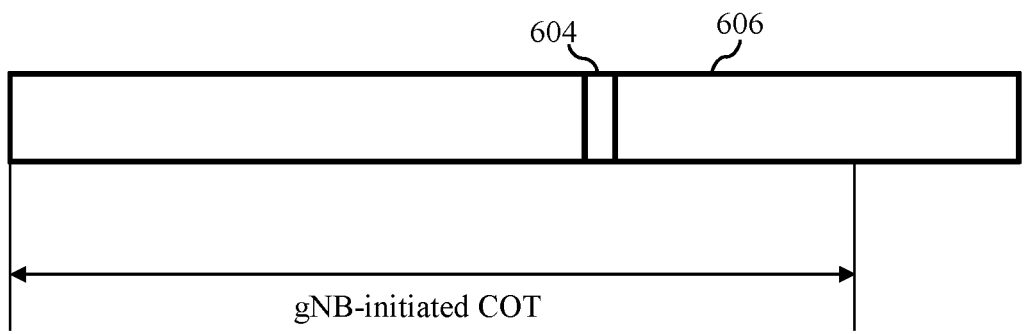
FIG. 6 illustrates multiple contiguous PUSCHs configured by Radio Resource Control (RRC) signaling according to some embodiments of the present disclosure.

FIG. 6 illustrates multiple contiguous PUSCHs configured by RRC signaling for a UE according to some embodiments of the present disclosure. As depicted in FIG. 6, a set of PUSCHs 606 following a DL-UL offset 604 is configured by RRC signaling as CG-PUSCHs. The set of PUSCHs 606 includes multiple contiguous PUSCHs without any gap in time domain resources. A portion of the set of PUSCHs 606 is located within a gNB-initiated COT while the remainder of the set of PUSCHs 606 is located outside of the gNB-initiated COT.

As mentioned above, according to LTE Rel-15 FeLAA, if the one-bit COT sharing indicator in a common PDCCH is set to TRUE, then a UE can use an LBT Cat.2 procedure for all PUSCH transmissions within the eNB-initiated COT. However, for the cases illustrated in FIGS. 4-6, not all the contiguous PUSCHs are within the gNB-initiated COT. Thus, a single LBT Cat.2 procedure may be insufficient for transmission of all the PUSCHs. Before transmitting UL data using the multiple contiguous PUSCHs as illustrated in FIGS. 4-6, the UE needs to determine the type of channel access procedure(s) to be performed as well as corresponding parameters for performing the channel access procedure(s). For example, if it is determined that an LBT Cat.4 procedure is to be performed, a UL CAPC value for performing the LBT Cat.4 procedure is needed to be determined.

Solutions to solve the aforementioned issues when DL-to-UL sharing is used will be described below.

In the cases where multiple contiguous PUSCHs are scheduled by one or more UL grants or configured by RRC signaling as CG-PUSCHs (e.g., as illustrated in FIGS. 4-6), wherein some of the multiple contiguous PUSCHs are located within a gNB-initiated COT while others of the multiple contiguous PUSCHs are located outside of the gNB-initiated COT, if DL-to-UL sharing is allowed (e.g., a COT sharing indicator in a common PDCCH is set to TRUE), the UE may divide the multiple contiguous PUSCHs into two sets for transmitting UL data. The first set includes the PUSCHs located within the gNB-initiated COT, and the second set includes the PUSCHs located outside of the gNB-initiated COT. Also, the UL data to be transmitted using the multiple contiguous PUSCHs may be divided into two parts. The first part includes UL data to be transmitted using the first set of PUSCHs, and the second part includes UL data to be transmitted using the second set of PUSCHs. According to some embodiments of the present disclosure, the UE may determine how to divide the PUSCHs into the two sets based on information about the DL channel access, which may be provided by a group common PDCCH (e.g., indicating structure information or remaining duration or total duration about the gNB-initiated COT) or a UE-specific PDCCH transmitted by the gNB after the gNB performs a channel access procedure to initiated the COT. For example, the UE may determine whether a PUSCH is located within or outside of the gNB-initiated COT based on one or more of the starting point of the gNB-initiated COT, the remaining duration of the gNB-initiated COT, or the maximum COT (MCOT) according to the DL CAPC value used by the gNB to initiate the COT.

Figure 7:
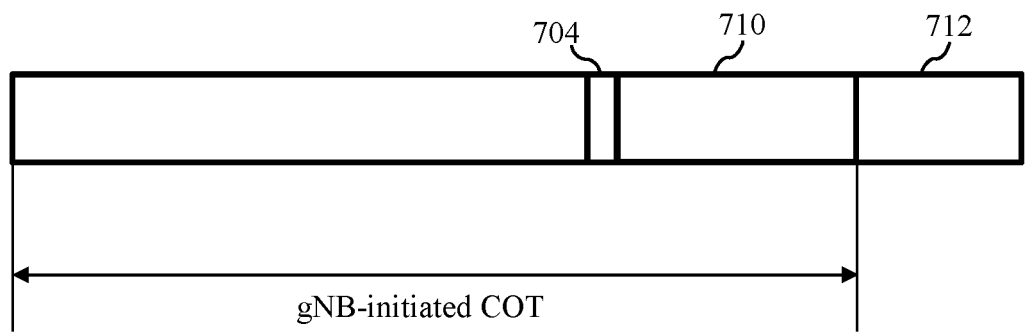
FIG. 7 illustrates multiple contiguous PUSCHs divided into two sets according some embodiments of the present disclosure.

FIG. 7 illustrates multiple contiguous PUSCHs divided into two sets according some embodiments of the present disclosure. The multiple contiguous PUSCHs may be scheduled by one or more UL grants or configured by RRC signaling as CG-PUSCHs. The first set of PUSCHs 710 following the DL-UL offset 704 is located within a gNB-initiated COT. The second set of PUSCHs 712 is located outside of the gNB-initiated COT. Each set may include one or more PUSCHs. The PUSCHs in either set are not necessarily scheduled by a single UL grant or configured by single RRC signaling.

Different types of channel access procedures (also named "LBT types") may be adopted for transmitting UL data using the two sets of PDSCHs, dependent on a comparison between a UL CAPC value based on the UL data to be transmitted and a DL CAPC value used by the gNB to initiate the COT. The DL CAPC value may be indicated by the gNB in the group common PDCCH or in the UE-specific DCI scheduling PUSCHs for the UE.

The UE may divide the UL data to be transmitted into a first part and a second part accordingly. The first set of PDSCHs 710 is used for transmitting the first part of the UL data, and the second set of PDSCHs 712 is used for transmitting the second part of the UL data.

According to an embodiment of the present disclosure, the UE may use a highest CAPC value determined based on both the first part of the UL data and the second part of the UL data as the UL CAPC value, and compare the UL CAPC value with the DL CAPC value for the gNB-initiated COT. If the UL CAPC value is smaller than or equal to the DL CAPC value, the UE performs an LBT Cat.2 procedure (e.g., in the DL-UL offset 704) for transmitting the first set of PUSCHs 710. If the LBT Cat.2 procedure is successful, then the UE starts to transmit the first part of the UL data using the first set of PUSCHs 710. The UE needs to perform an LBT Cat.4 procedure to obtain a UE-initiated COT before transmitting the second part of the UL data using the second set of PUSCHs 712, which are located outside of the gNB-initiated COT. In order to perform the LBT Cat.4 procedure, the UE punctures the last one or more symbols of the last PUSCH in the first set of PUSCHs 710 to generate a UL-to-UL gap. The duration of the UL-to-UL gap is dependent on the duration required to perform the LBT Cat.4 procedure, e.g., 72 us. Both the UE and the gNB should have the same understanding on the duration so that the gNB can know the location of the punctured symbols of the last PUSCH in the first set of PUSCHs 710. The concrete number of the punctured symbols of the last PUSCH in the first set of PUSCHs 710 is dependent on the subcarrier spacing used for PUSCH transmission. For example, for 15 kHz subcarrier spacing, at least one symbol is needed to be punctured as the UL-to-UL gap; for 30 kHz subcarrier spacing, at least one or two symbols are needed to be punctured as the UL-to-UL gap; for 60 kHz subcarrier spacing, at least four symbols are needed to be punctured as the UL-to-UL gap. The UE then performs the LBT Cat.4 procedure in the UL-to-UL gap for transmitting the second set of PUSCHs 712. The CAPC value used for performing the LBT Cat.4 procedure is determined based on the Quality of Service (QoS) of the UL data in the two sets or the QoS of only the second part of the UL data. Alternatively, the CAPC value used for performing the LBT Cat.4 procedure is indicated in a UL grant or configured by RRC signaling from the gNB.

If the UL CAPC value, which is the highest CAPC value determined based on both the first part of the UL data and the second part of the UL data, is larger than the DL CAPC value for the gNB-initiated COT, the UE suspends the transmission of the first part of the UL data (i.e., not using the first set of PUSCHs 710 to transmit the UL data). Since the first set of PUSCHs 710 is not used to transmit the UL data, the UE can perform an LBT Cat.4 procedure before the starting position of the first PUSCH in the second set of PUSCHs 712 to obtain a UE-initiated COT for transmitting the second part of the UL data on the second set of PUSCHs 712. The CAPC value used for performing the LBT Cat.4 procedure is determined based on the QoS of the UL data in the two sets or the QoS of only the second part of the UL data. Alternatively, the CAPC value used for performing the LBT Cat.4 procedure is indicated in a UL grant or configured by RRC signaling from the gNB.

According to another embodiment of the present disclosure, the UE may use a highest CAPC value determined only based on the first part of the UL data as the UL CAPC value, and compare the UL CAPC value with the DL CAPC value for the gNB-initiated COT. If the UL CAPC value is smaller than or equal to the DL CAPC value, the UE performs an LBT Cat.2 procedure (e.g., in the DL-UL offset 704) based on the UL CAPC value of the first part of the UL data for transmitting the first set of PUSCHs 710, and punctures the last one or more symbols of the last PUSCH in the first set of PUSCHs 710 to generate a UL-to-UL gap for performing an LBT Cat.4 procedure. The UE then performs the LBT Cat.4 procedure in the UL-to-UL gap for transmitting the second set of PUSCHs 712 based on a CAPC value determined only based on the second part of the UL data. If the UL CAPC value of the first part of the UL data is larger than the DL CAPC value for the gNB-initiated COT, the UE suspends the transmission of the first part of the UL data using the first set of PUSCHs 710, and performs an LBT Cat.4 procedure before the starting position of the first PUSCH in the second set of PUSCHs 712 based on a CAPC value determined only based on the second part of the UL data to obtain a UE-initiated COT for transmitting the second part of the UL data on the second set of PUSCHs 712.

According to another embodiment of the present disclosure, after determining the DL CAPC value based on the indication in the group common PDCCH or in the UE-specific DCI from the gNB, the UE may determine whether any portion of the first part of the UL data has a corresponding CAPC value not larger than the DL CAPC value. If there is at least one portion of the first part of the UL data having a corresponding CAPC value not larger than the DL CAPC value, the UE performs an LBT Cat.2 procedure (e.g., in the DL-UL offset 704) for transmitting only the at least one portion using the first set of PUSCHs 710, and punctures the last one or more symbols of the last PUSCH in the first set of PUSCHs 710 to generate a UL-to-UL gap for performing an LBT Cat.4 procedure. The UE then performs the LBT Cat.4 procedure in the UL-to-UL gap for transmitting the second set of PUSCHs 712 based on a CAPC value determined only based on the second part of the UL data. If there is no portion of the first part of the UL data having a corresponding CAPC value not larger than the DL CAPC value, the UE does not generate any TB for transmitting on the first set of PUSCHs 710 and skips transmission of the first set of PUSCHs 710. The UE then performs an LBT Cat.4 procedure before the starting position of the first PUSCH in the second set of PUSCHs 712 based on a CAPC value determined only based on the second part of the UL data to obtain a UE-initiated COT for transmitting the second part of the UL data on the second set of PUSCHs 712.

According to some embodiments of the present disclosure, if the UL CAPC value, which is the highest CAPC value determined based on both the first part of the UL data and the second part of the UL data or the highest CAPC value determined only based on the first part of the UL data, is larger than the DL CAPC used by the gNB for initiating the COT, the UE may perform an LBT Cat.4 procedure to initiate a UE-COT for transmitting both the first set of PUSCHs 710 and the second set of PUSCHs 712. If the LBT Cat.4 procedure is successful, then the UE starts to transmit the UL data using the first set of PUSCHs 710 and the second set of PUSCHs 712. The CAPC value used for performing the LBT Cat.4 procedure is determined based on the QoS of the UL data in the two sets. Alternatively, the CAPC value used for performing the LBT Cat.4 procedure is indicated in a UL grant or configured by RRC signaling from the gNB. If the UL MCOT corresponding to the CAPC value used for performing the LBT Cat.4 procedure is sufficient long to accommodate the duration of all the PUSCHs in both sets, then the UE transmits PUSCHs in both sets without any gap in time domain. Otherwise, the UE needs to puncture the last one or more symbols of the last PUSCH in the UL MCOT as a UL-to-UL gap in order to perform an LBT Cat.2 or Cat.4 procedure for transmitting the remaining PUSCHs. The duration of the UL-to-UL gap is dependent on the LBT type for transmitting the remaining PUSCHs. If an LBT Cat.2 procedure is adopted, a duration of 16 us or 25 us is required; if an LBT Cat.4 procedure is adopted, then a duration of tens of microseconds (e.g., 72 us) is required. The concrete number of the punctured symbols of the last PUSCH in the UL MCOT is dependent on the subcarrier spacing used for PUSCH transmission. For example, if an LBT Cat.4 procedure is adopted, for 15 kHz subcarrier spacing, at least one symbol is needed to be punctured as the UL-to-UL gap; for 30 kHz subcarrier spacing, at least one or two symbols are needed to be punctured as the UL-to-UL gap; for 60 kHz subcarrier spacing, at least four symbols are needed to be punctured as the UL-to-UL gap. If an LBT Cat.2 procedure is adopted, for 15 kHz or 30 kHz subcarrier spacing, at least one symbol is needed to be punctured as the UL-to-UL gap; for 60 kHz subcarrier spacing, at least one or two symbols are needed to be punctured as the UL-to-UL gap.

According to some other embodiments of the present disclosure, as long as one of the multiple contiguous PUSCHs is outside of the gNB-initiated COT, the UE may perform an LBT Cat.4 procedure to initiate a UE-COT for transmitting both the first set of PUSCHs 710 and the second set of PUSCHs 712. If the LBT Cat.4 procedure is successful, then the UE starts to transmit the UL data using the first set of PUSCHs 710 and the second set of PUSCHs 712. The CAPC value used for performing the LBT Cat.4 procedure is determined based on the QoS of the UL data in the two sets. Alternatively, the CAPC value used for performing the LBT Cat.4 procedure is indicated in a UL grant or configured by RRC signaling from the gNB. If the UL MCOT corresponding to the CAPC value used for performing the LBT Cat.4 procedure is sufficient long to accommodate the duration of all the PUSCHs in both sets, then the UE transmits PUSCHs in both sets without any gap in time domain. Otherwise, the UE needs to puncture the last one or more symbols of the last PUSCH in the UL MCOT as a UL-to-UL gap in order to perform an LBT Cat.2 or Cat.4 procedure for transmitting the remaining PUSCHs. The duration of the UL-to-UL gap is dependent on the LBT type for transmitting the remaining PUSCHs. If an LBT Cat.2 procedure is adopted, a duration of 16 us or 25 us is required; if an LBT Cat.4 procedure is adopted, then a duration of tens of microseconds (e.g., 72 us) is required. The concrete number of the punctured symbols of the last PUSCH in the UL MCOT is dependent on the subcarrier spacing used for PUSCH transmission. For example, if an LBT Cat.4 procedure is adopted, for 15 kHz subcarrier spacing, at least one symbol is needed to be punctured as the UL-to-UL gap; for 30 kHz subcarrier spacing, at least one or two symbols are needed to be punctured as the UL-to-UL gap; for 60 kHz subcarrier spacing, at least four symbols are needed to be punctured as the UL-to-UL gap. If an LBT Cat.2 procedure is adopted, for 15 kHz or 30 kHz subcarrier spacing, at least one symbol is needed to be punctured as the UL-to-UL gap; for 60 kHz subcarrier spacing, at least one or two symbols are needed to be punctured as the UL-to-UL gap.

In some cases, the UE may not have information about the DL channel access. For example, information about the structure or total duration or remaining duration of the gNB-initiated COT is not configured or received by the UE. The UE cannot determine whether any of the multiple contiguous PUSCHs is outside of the gNB-initiated COT or divide the multiple contiguous PUSCHs into two sets as described above. In such cases, the UE may perform an LBT Cat.4 procedure to initiate a UE-COT for transmitting the multiple contiguous PUSCHs. If the LBT Cat.4 procedure is successful, then the UE starts to transmit the UL data using the multiple contiguous PUSCHs. The CAPC value used for performing the LBT Cat.4 procedure is determined based on the QoS of the UL data. Alternatively, the CAPC value used for performing the LBT Cat.4 procedure is indicated in a UL grant or configured by RRC signaling from the gNB. If the UL MCOT corresponding to the CAPC value used for performing the LBT Cat.4 procedure is sufficient long to accommodate the duration of all the multiple contiguous PUSCHs, then the UE transmits the multiple contiguous PUSCHs without any gap in time domain. Otherwise, the UE needs to puncture the last one or more symbols of the last PUSCH in the UL MCOT as a UL-to-UL gap in order to perform an LBT Cat.2 or Cat.4 procedure for transmitting the remaining PUSCHs. The duration of the UL-to-UL gap is dependent on the LBT type for transmitting the remaining PUSCHs. If an LBT Cat.2 procedure is adopted, a duration of 16 us or 25 us is required; if an LBT Cat.4 procedure is adopted, then a duration of tens of microseconds (e.g., 72 us) is required. The concrete number of the punctured symbols of the last PUSCH in the UL MCOT is dependent on the subcarrier spacing used for PUSCH transmission. For example, if an LBT Cat.4 procedure is adopted, for 15 kHz subcarrier spacing, at least one symbol is needed to be punctured as the UL-to-UL gap; for 30 kHz subcarrier spacing, at least one or two symbols are needed to be punctured as the UL-to-UL gap; for 60 kHz subcarrier spacing, at least four symbols are needed to be punctured as the UL-to-UL gap. If an LBT Cat.2 procedure is adopted, for 15 kHz or 30 kHz subcarrier spacing, at least one symbol is needed to be punctured as the UL-to-UL gap; for 60 kHz subcarrier spacing, at least one or two symbols are needed to be punctured as the UL-to-UL gap.

Figure 8:
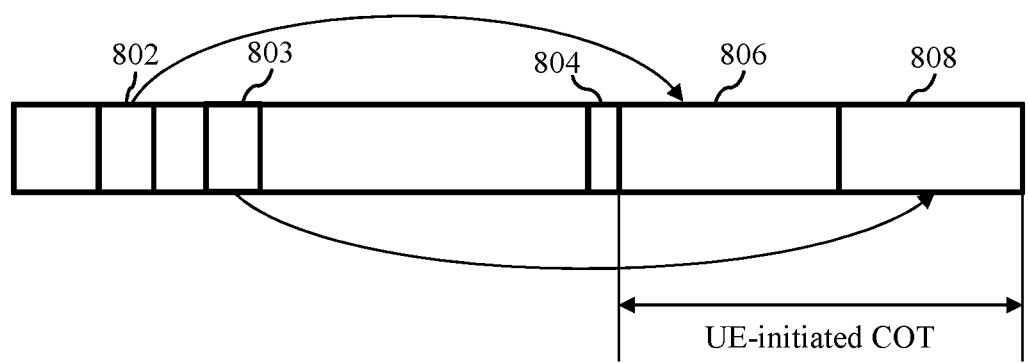
FIG. 8 illustrates multiple contiguous PUSCHs scheduled by multiple UL grants according to some embodiments of the present disclosure.

On the other hand, a UE may receive multiple UL grants from a gNB which schedule multiple contiguous PUSCHs, but the multiple UL grants may indicate different LBT related parameters if the gNB changes its mind based on, for example, traffic data to be transmitted. FIG. 8 illustrates multiple contiguous PUSCHs scheduled by multiple UL grants according to some embodiments of the present disclosure. Although only two UL grants are illustrated in FIG. 8, one skilled in the art will recognize that more UL grants may be received by a UE and similar procedures may be adopted. The UE may perform a channel access procedure (e.g., LBT Cat.4 procedure) in a time interval 804 to initiate a COT. Before performing the channel access procedure, the UE receives (or decodes) DCI 802 and DCI 803 from a gNB, wherein DCI 802 is received by the UE earlier than DCI 803. DCI 802 schedules a first set of PUSCHs 806 and DCI 803 schedules a second set of PUSCHs 808. Each set includes one or more PUSCHs without any gap in time domain resources, and there is no gap between the two sets. The first set of PUSCHs 806 is used to transmit a first part of the UL data, and the second set of PUSCHs 808 is used to transmit a second part of the UL data. The first set of PUSCHs 806 and the second set of PUSCHs 808 may be accommodated within the UE-initiated COT, as shown in FIG. 8. In some other embodiments of the present disclosure, the UE-initiated COT may not accommodate both of the two sets. DCI 802 may indicate a first type of channel access procedure (i.e., a first LBT type) and a first UL CAPC value. DCI 803 may indicate a second type of channel access procedure (i.e., a second LBT type) and a second UL CAPC value. In some embodiments of the present disclosure, the first LBT type may be different from the second LBT type. In other embodiments of the present disclosure, the first UL CAPC value may be different from the second UL CAPC value. In such scenarios, the UE needs to determine the type of channel access procedure to be performed for transmission of the two sets of PUSCHs and/or the UL CAPC value to be used for performing the channel access procedure.

Figure 9:
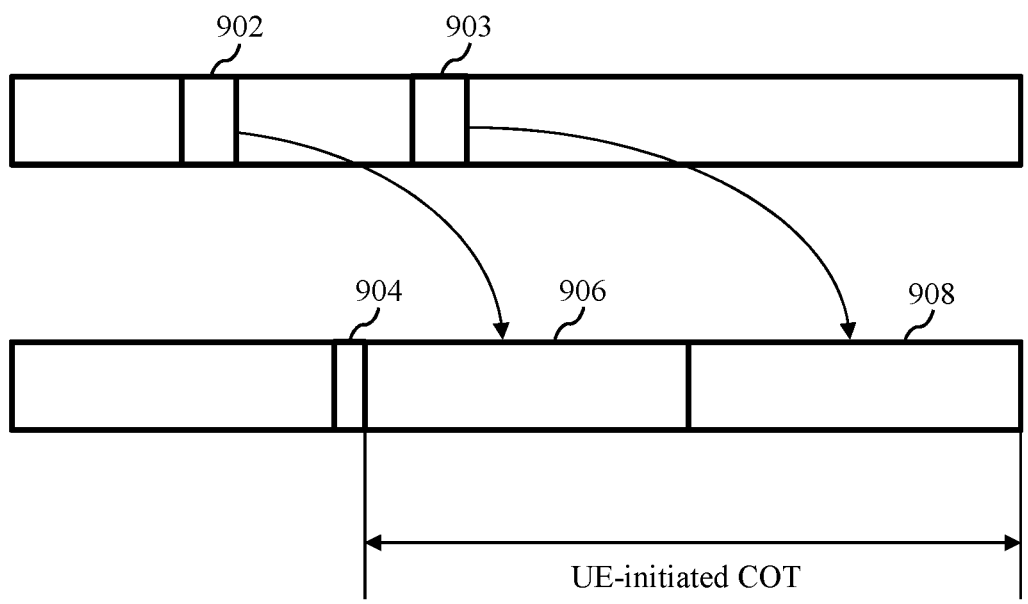
FIG. 9 illustrates multiple contiguous PUSCHs scheduled by multiple UL grants according to some other embodiments of the present disclosure.

FIG. 9 illustrates multiple contiguous PUSCHs scheduled by multiple UL grants according to some other embodiments of the present disclosure. Although only two UL grants are illustrated in FIG. 9, one skilled in the art will recognize that more UL grants may be received by a UE and similar procedures may be adopted. The UE may perform a channel access procedure (e.g., LBT Cat.4 procedure) in a time interval 904 to initiate a COT. The UE may receive DCI 902 and DCI 903 from a gNB, e.g., via cross-carrier scheduling from another carrier. DCI 902 schedules a first set of PUSCHs 906 and DCI 903 schedules a second set of PUSCHs 908. Each set includes one or more PUSCHs without any gap in time domain resources, and there is no gap between the two sets. The first set of PUSCHs 906 is used to transmit a first part of the UL data, and the second set of PUSCHs 908 is used to transmit a second part of the UL data. DCI 902 is received (or decoded) before the UE performs the channel access procedure, and DCI 903 is received (or decoded) while the UE is transmitting the first set of PUSCHs 906. Alternatively, DCI 903 may be received (or decoded) in the time interval 904, i.e., while the UE is performing the channel access procedure. The first set of PUSCHs 906 and the second set of PUSCHs 908 may be accommodated within the UE-initiated COT, as shown in FIG. 9. In some other embodiments of the present disclosure, the UE-initiated COT may not accommodate both of the two sets. DCI 902 may indicate a first type of channel access procedure (i.e., a first LBT type) and a first UL CAPC value. DCI 903 may indicate a second type of channel access procedure (i.e., a second LBT type) and a second UL CAPC value. In some embodiments of the present disclosure, the first LBT type may be different from the second LBT type.

In other embodiments of the present disclosure, the first UL CAPC value may be different from the second UL CAPC value. In such scenarios, the UE needs to determine how to continue the transmission of the first set of PUSCHs 906. The UE also needs to determine the type of channel access procedure to be performed for transmission of the second set of PUSCHs 908 and/or the UL CAPC value to be used for performing the channel access procedure.

According to some embodiments of the present disclosure, the multiple UL grants scheduling multiple contiguous PUSCHs for a UE may indicate different COT sharing parameters (e.g., whether to request the UE to share the COT, or how long the requested DL transmission is needed). Upon receiving such UL grants, the UE needs to determine how to share the UE-initiated COT with the gNB to avoid any misunderstanding between the UE and the gNB.

Solutions to solve the aforementioned issues will be described below.

Referring back to FIG. 8, in which the UE receives the later UL grant before performing a channel access procedure indicated by the earlier UL grant to initiate a COT, if the UE determines that the second LBT type indicated by DCI 803 is different from the first LBT type indicated by DCI 802, the UE performs the second LBT type to initiate a COT for transmitting both the first part of the uplink data using the first set of PUSCHs 806 and the second part of the uplink data using the second set of PUSCHs 808. For example, if DCI 802 indicates an LBT Cat.2 procedure while DCI 803 indicates an LBT Cat.4 procedure, the UE performs the LBT Cat.4 procedure for transmitting both the first part of the uplink data using the first set of PUSCHs 806 and the second part of the uplink data using the second set of PUSCHs 808. If DCI 802 indicates an LBT Cat.4 procedure while DCI 803 indicates an LBT Cat.2 procedure, the UE performs the LBT Cat.2 procedure for transmitting both the first part of the uplink data using the first set of PUSCHs 806 and the second part of the uplink data using the second set of PUSCHs 808.

If the UE determines that the second UL CAPC value indicated by DCI 803 is larger than the first UL CAPC value indicated by DCI 802, the UE uses the second UL CAPC value (i.e., the maximum CAPC value of the first and second UL CAPC values) to perform a channel access procedure (e.g., an LBT Cat.4 procedure) to initiate a COT for transmitting both the first part of the uplink data using the first set of PUSCHs 806 and the second part of the uplink data using the second set of PUSCHs 808.

If the UE determines that the second UL CAPC value indicated by DCI 803 is smaller than the first UL CAPC value indicated by DCI 802, the UE ignores the second UL CAPC value and uses the first UL CAPC value (i.e., the maximum CAPC value of the first and second UL CAPC values) to perform a channel access procedure (e.g., an LBT Cat.4 procedure) to initiate a COT for transmitting both the first part of the uplink data using the first set of PUSCHs 806 and the second part of the uplink data using the second set of PUSCHs 808.

According to another embodiment of the present disclosure, the UE may use the second UL CAPC value to perform a channel access procedure if the second UL CAPC value is smaller than the first UL CAPC value. The UE may further determine whether the UL MCOT corresponding to the second UL CAPC value is sufficient long to accommodate the duration of both the first set of PUSCHs 806 and the second set of PUSCHs 808. If the UL MCOT is sufficient long, then the UE transmits the UL data using the multiple contiguous PUSCHs without any gap in time domain. If the UL MCOT is not sufficient long, then the UE transmits the uplink data using the PUSCHs accommodated in the MCOT, and punctures the last one or more symbols of the last PUSCH in the UL MCOT as a UL-to-UL gap for performing a channel access procedure to initiate another COT for transmitting the remaining part of the uplink data using the remaining PUSCHs of the multiple contiguous PUSCHs. The duration of the UL-to-UL gap is dependent on the LBT type for transmitting the remaining PUSCHs. If an LBT Cat.2 procedure is adopted, a duration of 16 us or 25 us is required; if an LBT Cat.4 procedure is adopted, then a duration of tens of microseconds (e.g., 72 us) is required. The concrete number of the punctured symbols of the last PUSCH in the UL MCOT is dependent on the subcarrier spacing used for PUSCH transmission. For example, if an LBT Cat.4 procedure is adopted, for 15 kHz subcarrier spacing, at least one symbol is needed to be punctured as the UL-to-UL gap; for 30 kHz subcarrier spacing, at least one or two symbols are needed to be punctured as the UL-to-UL gap; for 60 kHz subcarrier spacing, at least four symbols are needed to be punctured as the UL-to-UL gap. If an LBT Cat.2 procedure is adopted, for 15 kHz or 30 kHz subcarrier spacing, at least one symbol is needed to be punctured as the UL-to-UL gap; for 60 kHz subcarrier spacing, at least one or two symbols are needed to be punctured as the UL-to-UL gap.

According to another embodiment of the present disclosure, in the case where the second UL CAPC value is smaller than the first UL CAPC value, if the UE determines that the UL MCOT corresponding to the second UL CAPC value is sufficient long to accommodate the duration of both the first set of PUSCHs 806 and the second set of PUSCHs 808, the UE uses the second UL CAPC value to perform a channel access procedure for transmitting both the first part of the uplink data using the first set of PUSCHs 806 and the second part of the uplink data using the second set of PUSCHs; otherwise, the UE uses the first UL CAPC value to perform the channel access procedure.

Referring back to FIG. 9, in which the UE receives the later UL grant while performing a channel access procedure indicated by the earlier UL grant to initiate a COT for transmitting the first set of PUSCHs 906 or while transmitting the first set of PUSCHs 906, if the UE determines that the second LBT type indicated by DCI 903 is different from the first LBT type indicated by DCI 902, the UE may ignore the second LBT type indicated by DCI 903, and continue the transmission of the second set of PUSCHs 908 scheduled by DCI 903 after completing transmitting the first set of PUSCHs 906 scheduled by DCI 902. According to another embodiment of the present disclosure, if the UE determines that the second LBT type indicated by DCI 903 is different from the first LBT type indicated by DCI 902, the UE may puncture the last one or more symbols of the last PUSCH in the first set of PUSCHs 906 scheduled by DCI 902 to perform the second LBT type indicated by DCI 903 before transmitting the second set of PUSCHs 908. For example, if DCI 902 indicates an LBT Cat.2 procedure while DCI 903 indicates an LBT Cat.4 procedure, the UE may puncture the last one or more symbols of the last PUSCH in the first set of PUSCHs 906 scheduled by DCI 902 to perform an LBT Cat.4 procedure before transmitting the second set of PUSCHs 908; if DCI 902 indicates an LBT Cat.4 procedure while DCI 903 indicates an LBT Cat.2 procedure, the UE may puncture the last one or more symbols of the last PUSCH in the first set of PUSCHs 906 scheduled by DCI 902 to perform an LBT Cat.2 procedure before transmitting the second set of PUSCHs 908.

If the UE determines that the second UL CAPC value indicated by DCI 903 is larger than the first UL CAPC value indicated by DCI 902, the UE may ignore the second UL CAPC value and continue the transmission of the second set of PUSCHs 908 scheduled by DCI 903 after completing transmitting the first set of PUSCHs 906 scheduled by DCI 902. In such a case, the UE should guarantee the total duration of the multiple contiguous PUSCHs does not exceed the MCOT corresponding to the UL CAPC value indicated by DCI 902. If the total duration of the multiple contiguous PUSCHs exceeds the MCOT, the UE needs to puncture the last one or more symbols of the last PUSCH in the MCOT as a UL-to-UL gap for performing a channel access procedure to initiate another COT for transmitting the remaining part of the uplink data using the remaining PUSCHs of the multiple contiguous PUSCHs.

Alternatively, the UE may puncture the last one or more symbols of the last PUSCH in the first set of PUSCHs 906 scheduled by DCI 902 to perform a channel access procedure using the second UL CAPC value indicated by DCI 903 before transmitting the second set of PUSCHs 908.

If the UE determines that the second UL CAPC value indicated by DCI 903 is smaller than the first UL CAPC value indicated by DCI 902, the UE may ignore the second UL CAPC value and continue the transmission of the second set of PUSCHs 908 scheduled by DCI 903 after completing transmitting the first set of PUSCHs 906 scheduled by DCI 902.

Alternatively, the UE may puncture the last one or more symbols of the last PUSCH in the first set of PUSCHs 906 scheduled by DCI 902 to perform a channel access procedure using the second UL CAPC value indicated by DCI 903 before transmitting the second set of PUSCHs 908. In such a case, the UE should guarantee the total duration of the multiple contiguous PUSCHs does not exceed the MCOT corresponding to the UL CAPC value indicated by DCI 903.

According to some embodiments of the present disclosure, the UE may receive the later UL grant indicating a UL CAPC value different from the earlier UL grant while performing an LBT Cat.4 procedure for the first PUSCH scheduled by the earlier UL grant. The UE may use the UL CAPC value indicated in the later UL grant to determine a size of the contention window and a UL MOT. The UE may terminate the ongoing counting down of the random backoff counter generated based on the UL CAPC value indicated in the earlier UL grant and generate a new random backoff counter based on the UL CAPC value indicated in the later UL grant. Then the UE may count down the new random backoff counter if the channel is sensed idle in an ECCA slot.

With reference to FIGS. 8 and 9, in the case where UE completes the transmission of the first part of the UL data (i.e., there is no data in its buffer) before the last PUSCH in the first set of PUSCHs, the UE may generate dummy data and transmit the dummy data to avoid the risk of losing the channel. The dummy data may occupy the position of a demodulation reference signal (DMRS) so that the gNB may skip channel estimation and demodulation since the DMRS is not detected. Alternatively, the DMRS may be transmitted together with the dummy data so that the performance of channel estimation is not affected.

According to another embodiment of the present disclosure, the UE may skip the transmission of the remaining PUSCH(s) in the first set of PUSCHs if there is no data in its buffer. The UE may detect whether the channel is still idle by performing an LBT Cat.2 procedure upon receipt of the later UL grant. If the channel is still idle, the UE may transmit the second set of PUSCHs scheduled by the later UL grant.

The UE should guarantee the total duration of both sets of PUSCHs does not exceed the MCOT corresponding to the UL CAPC value indicated in the earlier UL grant if it determines to transmit both sets of PUSCHs within the COT initiated based on the earlier UL grant.

In some cases, the UE may receive from the gNB multiple UL grants scheduling multiple contiguous PUSCHs indicating different COT sharing parameters (e.g., whether to request the UE to share the COT, or how long the requested DL transmission is needed).

Figure 10:
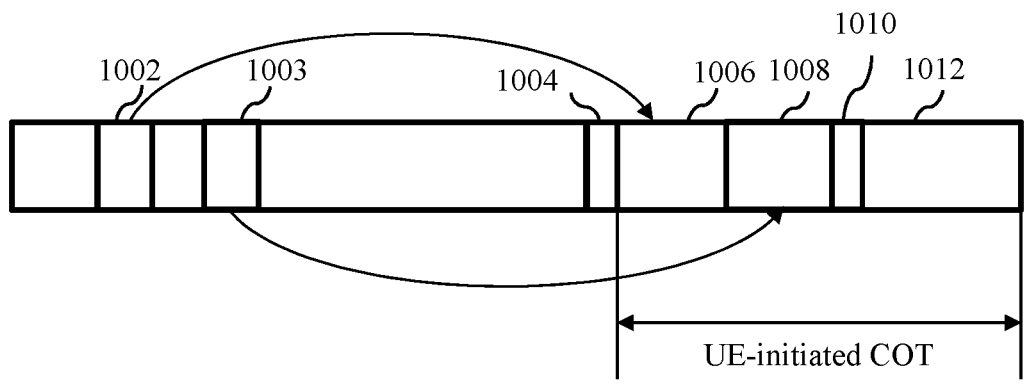
FIG. 10 illustrates UL-to-DL sharing indicated by multiple UL grants according to some embodiments of the present disclosure.

FIG. 10 illustrates UL-to-DL sharing indicated by multiple UL grants according to some embodiments of the present disclosure. Although only two UL grants are illustrated in FIG. 10, one skilled in the art will recognize that more UL grants may be received by a UE and similar procedures may be adopted. The UE may perform a channel access procedure (e.g., LBT Cat.4 procedure) in a time interval 1004 to initiate a COT. Before performing the channel access procedure, the UE receives (or decodes) DCI 1002 and DCI 1003 from a gNB, wherein DCI 1002 is received by the UE earlier than DCI 1003. DCI 1002 schedules a first set of PUSCHs 1006 and DCI 1003 schedules a second set of PUSCHs 1008. Each set includes one or more PUSCHs without any gap in time domain resources, and there is no gap between the two sets. The first set of PUSCHs 1006 is used to transmit a first part of the UL data, and the second set of PUSCHs 1008 is used to transmit a second part of the UL data. If the UE-initiated COT is allowed to share to the gNB for transmitting DL data, the UE-initiated COT may include a DL transmission duration 1012. The UE-initiated COT includes a UL-DL offset 1010 between the PUSCHs and the DL transmission duration 1012.

If the COT sharing parameter indicated in DCI 1003 is different from the COT sharing parameter indicated in DCI 1002, the UE may follow the COT sharing parameter indicated in DCI 1003 as long as DCI 1003 is successfully decoded by the UE before the UE starts to perform a channel access procedure indicated by DCI 1002. Alternatively, a duration immediately before the UE starts to perform the channel access procedure indicated by DCI 1002 can be predefined in standard or configured by RRC signaling. Any UL grant received or decoded within the duration is neglected. That is, the UE follows the COT sharing parameter indicated in DCI 1003 if DCI 1003 is successfully decoded by the UE before the duration. With the predefined or configured duration, the UE does not need to process the COT sharing parameter received within the duration, and thus the processing requirements on any change of the COT sharing parameter can be relaxed.

Figure 11:
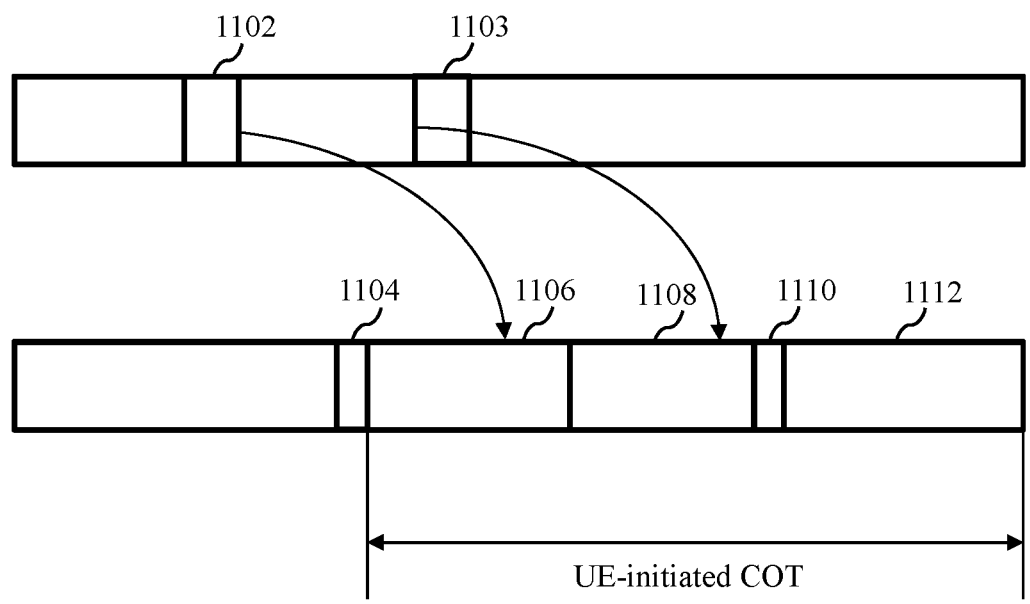
FIG. 11 illustrates UL-to-DL sharing indicated by multiple UL grants according to some other embodiments of the present disclosure.

FIG. 11 illustrates UL-to-DL sharing indicated by multiple UL grants according to some other embodiments of the present disclosure. Although only two UL grants are illustrated in FIG. 11, one skilled in the art will recognize that more UL grants may be received by a UE and similar procedures may be adopted. The UE may perform a channel access procedure (e.g., LBT Cat.4 procedure) in a time interval 1104 to initiate a COT. The UE may receive DCI 1102 and DCI 1103 from a gNB, e.g., via cross-carrier scheduling from another carrier. DCI 1102 schedules a first set of PUSCHs 1106 and DCI 1103 schedules a second set of PUSCHs 1108. Each set includes one or more PUSCHs without any gap in time domain resources, and there is no gap between the two sets. The first set of PUSCHs 1106 is used to transmit a first part of the UL data, and the second set of PUSCHs 1108 is used to transmit a second part of the UL data. DCI 1102 is received (or decoded) before the UE performs the channel access procedure, and DCI 1103 is received (or decoded) while the UE is transmitting the first set of PUSCHs 906. Alternatively, DCI 1103 may be received (or decoded) in the time interval 1104, i.e., while the UE is performing the channel access procedure. If the UE-initiated COT is allowed to share to the gNB for transmitting DL data, the UE-initiated COT may include a DL transmission duration 1112. The UE-initiated COT includes a UL-DL offset 1110 between the PUSCHs and the DL transmission duration 1112.

If the UE determines that a second DL duration indicated by DCI 1103 is longer than a first DL duration indicated by DCI 1102, the UE-initiated COT obtained by performing a channel access procedure based on DCI 1102 may not accommodate the total duration of the ongoing UL transmission and the DL transmission requested by DCI 1103. The UE may prioritize the ongoing UL transmission by continuing the unfinished UL transmission and then sharing the remaining COT based on the first DL duration indicated by DCI 1102. Alternatively, the UE may prioritize the requested DL transmission by shortening the unfinished UL transmission and then sharing the remaining COT based on the second DL duration indicated by DCI 1103. Whether the UE prioritize the ongoing UL transmission or the request DL transmission can be configured by the gNB, or fixed in standard (e.g., always UL prioritized, or always DL prioritized).

If the UE determines that the second DL duration indicated by DCI 1103 is shorter than the first DL duration indicated by DCI 1102, the UE-initiated COT obtained by performing a channel access procedure based on DCI 1102 may accommodate the total duration of the ongoing UL transmission and the DL transmission requested by DCI 1103. The UE may continue the unfinished UL transmission and then share the remaining COT based on the second DL duration indicated by DCI 1103.

If the UE determines that a second UL CAPC value indicated by DCI 1103 is larger than a first UL CAPC value indicated by DCI 1102, the UE may regard that the gNB schedules two separate UE-initiated COTs. Accordingly, the UE may terminate the transmission of the first set of PUSCHs 1106 scheduled by DCI 1102 at least a predefined time interval immediately before the transmission of the second set of PUSCHs 1108 scheduled by DCI 1103 so as to perform a channel access procedure (e.g., an LBT Cat.4 procedure) during the predefined time interval using the second UL CAPC value indicated by DCI 1103. The duration of the predefined time interval can be a slot, a number of symbols, or just a duration specified in unit of microseconds.

If the UE determines that the second UL CAPC value indicated by DCI 1103 is smaller than the first UL CAPC value indicated by DCI 1102, the UE may determine whether the UL MCOT corresponding to the first UL CAPC is sufficiently long to accommodate the total duration of the first set of PUSCHs 1106 scheduled by DCI 1102 and the second set of PUSCHs 1108 scheduled by DCI 1103. If the UL MCOT is sufficiently long, then the UE continues the transmission of the second set of PUSCHs 1108 scheduled by DCI 1103 after completion of the transmission of the first set of PUSCHs 1106 scheduled by DCI 1102.

If the UL MCOT is not sufficiently long, then the UE regards that the gNB schedules two separate UE-initiated COTs. Accordingly, the UE may terminate the transmission of the first set of PUSCHs 1106 scheduled by DCI 1102 at least a predefined time interval immediately before the transmission of the second set of PUSCHs 1108 scheduled by DCI 1103 so as to perform a channel access procedure (e.g., an LBT Cat.4 procedure) during the predefined time interval using the second UL CAPC value indicated by DCI 1103. The duration of the predefined time interval can be a slot, a number of symbols, or just a duration specified in unit of microseconds.

According to some embodiments of the present disclosure, the UE may receive the later UL grant indicating a UL CAPC value different from the earlier UL grant while performing an LBT Cat.4 procedure for the first PUSCH scheduled by the earlier UL grant. The UE may use the UL CAPC value indicated in the later UL grant to determine a size of the contention window and a UL MOT. The UE may terminate the ongoing counting down of the random backoff counter generated based on the UL CAPC value indicated in the earlier UL grant and generate a new random backoff counter based on the UL CAPC value indicated in the later UL grant. Then the UE may count down the new random backoff counter if the channel is sensed idle in an ECCA slot.

Figure 12:
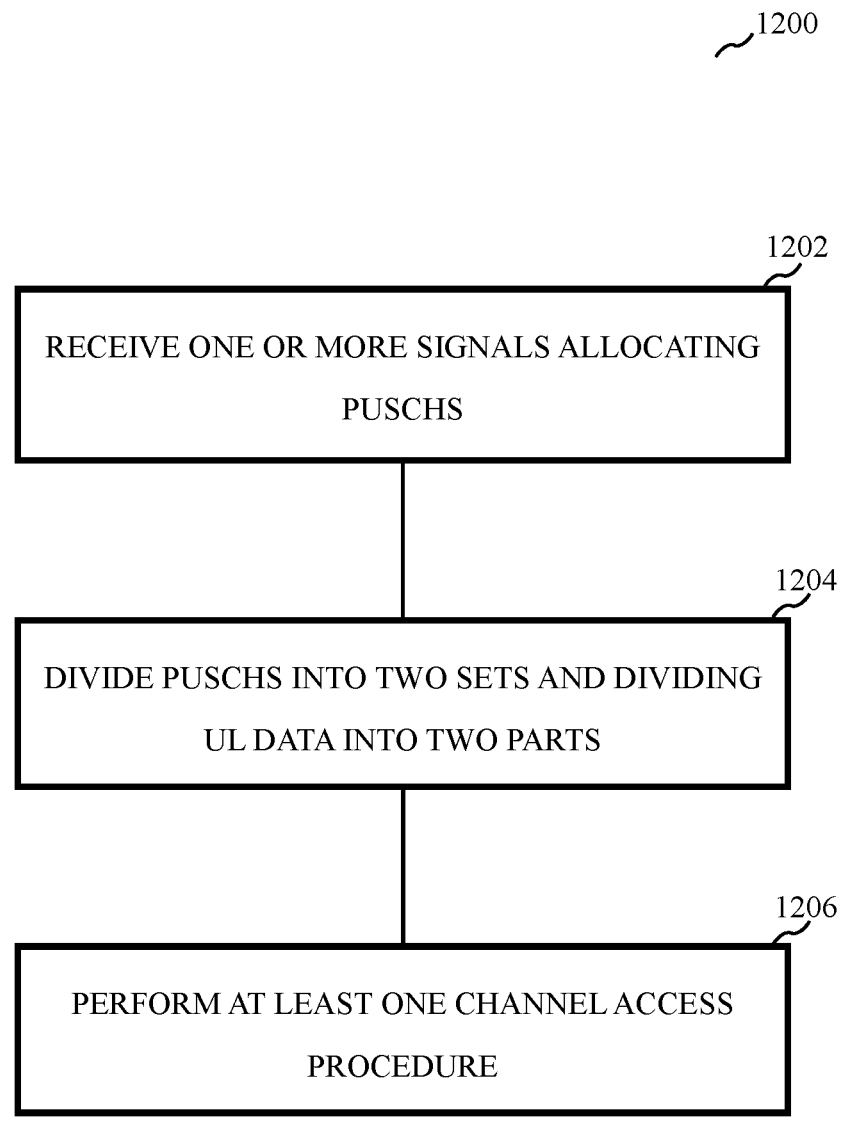
FIG. 12 illustrates an exemplary flow chart of a method performed by a UE for wireless communication according to some embodiments of the present disclosure.

FIG. 12 illustrates an exemplary flow chart of a method 1200 performed by a UE (e.g., UE 101 in FIG. 1) for wireless communication according to some embodiments of the present disclosure.

As shown in FIG. 12, in step 1202, the UE receives, from a BS, one or more signals allocating a plurality of PUSCHs for transmitting uplink data, wherein the plurality of PUSCHs are contiguous in time domain. According to some embodiments of the present disclosure, the one or more signals are one or more pieces of DCI, RRC signaling, or a combination thereof.

In step 1204, the UE divides the plurality of PUSCHs into a first set of PUSCHs and a second set of PUSCHs, and further divides the uplink data into a first part of the uplink data and a second part of the uplink data, wherein the first set of PUSCHs is used for transmitting the first part of the uplink data and the second set of PUSCHs is used for transmitting the second part of the uplink data. According to an embodiment of the present disclosure, the first set of PUSCHs is within a COT initiated by the BS, and the second set of PUSCHs is outside of the COT. According to another embodiment of the present disclosure, the first set of PUSCHs is allocated by a first signal of the one or more signals, the second set of PUSCHs is allocated by a second signal of the one or more signals, and the first signal is received by the UE earlier than the second signal.

In step 1206, the UE performs at least one channel access procedure for transmitting the first part of the uplink data using the first set of PUSCHs and the second part of the uplink data using the second set of PUSCHs. According to an embodiment of the present disclosure, the UE performs a channel access procedure for transmitting the first part of the uplink data using the first set of PUSCHs, and further performs another channel access procedure for transmitting the second part of the uplink data using the second set of PUSCHs. According to another embodiment of the present disclosure, the UE performs one channel access procedure for transmitting both the first part of the uplink data using the first set of PUSCHs and the second part of the uplink data using the second set of PUSCHs. According to another embodiment of the present disclosure, the UE suspends the transmission of the first part of the uplink data and only performs a channel access procedure for transmitting the second part of the uplink data using the second set of PUSCHs. The UE may determine how to perform the at least one channel access procedure according to any of the methods described herein.

After performing the at least one channel access procedure, the UE transmits the uplink data to the BS using the PUSCHs.

Figure 13:
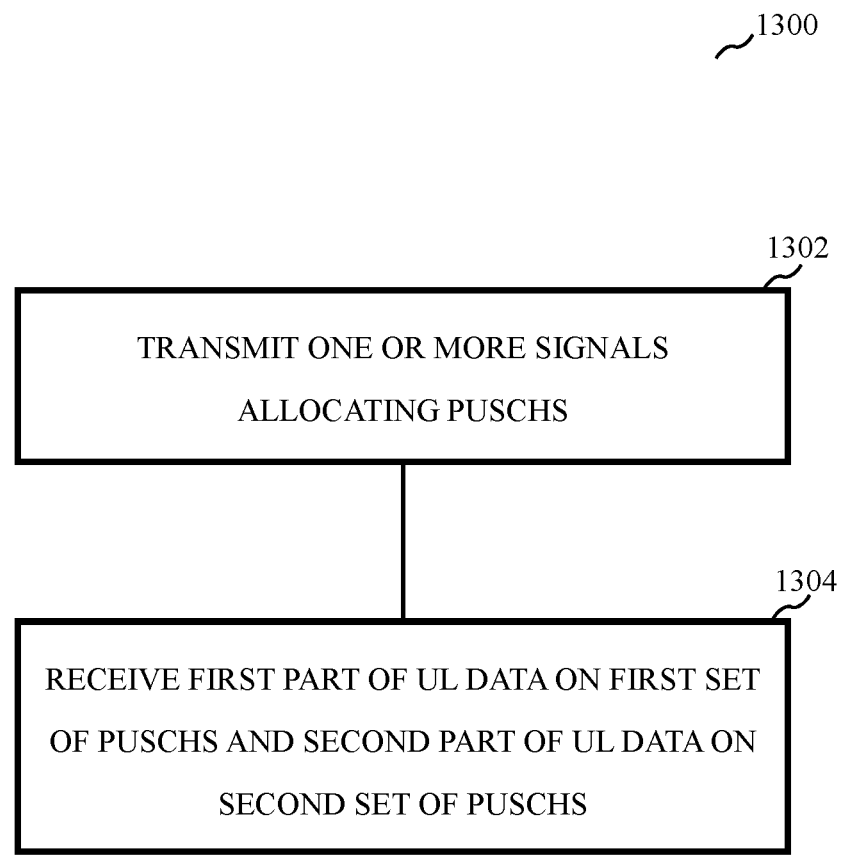
FIG. 13 illustrates an exemplary flow chart of a method performed by a BS for wireless communication according to some embodiments of the present disclosure.

FIG. 13 illustrates an exemplary flow chart of a method 1300 performed by a BS (e.g., BS 102 in FIG. 1) for wireless communication according to some embodiments of the present disclosure.

As shown in FIG. 13, in step 1302, the BS transmits to a UE one or more signals allocating a plurality of PUSCHs for transmitting uplink data, wherein the plurality of PUSCHs are contiguous in time domain. According to some embodiments of the present disclosure, the one or more signals are one or more pieces of DCI, RRC signaling, or a combination thereof.

In step 1304, the BS receives a first part of the uplink data on a first set of PUSCHs and a second part of the uplink data on a second set of PUSCHs, wherein the plurality of PUSCHs comprise the first set of PUSCHs and the second set of PUSCHs, and the uplink data comprises the first part of the uplink data and the second part of the uplink data. According to an embodiment of the present disclosure, the first set of PUSCHs is within a COT initiated by the BS, and the second set of PUSCHs is outside of the COT. According to another embodiment of the present disclosure, the first set of PUSCHs is allocated by a first signal of the one or more signals, the second set of PUSCHs is allocated by a second signal of the one or more signals, and the first signal is received by the UE earlier than the second signal.

In an embodiment of the present disclosure, the one or more signals indicate a CAPC value used by the BS for initiating the COT. In another embodiment of the present disclosure, the one or more signals indicate a type of channel access procedure for the UE. According to some embodiments of the present disclosure, the channel access procedure may have two types: a Type-1 channel access procedure having a CAPC value corresponding to a contention window where a random backoff counter is generated, and a Type-2 channel access procedure being one-shot sensing predefined with a minimum sensing interval.

In an embodiment of the present disclosure, the one or more signals indicate a CAPC value used by the UE for initiating a COT. According to some embodiments of the present disclosure, the CAPC value is determined to accommodate the plurality of PUSCHs. According to some other embodiments of the present disclosure, the CAPC value is determined to accommodate both the plurality of PUSCHs and a downlink duration for downlink transmission in the COT indicated by the UE. In some embodiments of the present disclosure, the one or more signals indicate a downlink duration for downlink transmission in a COT initiated by the UE.

Figure 14:
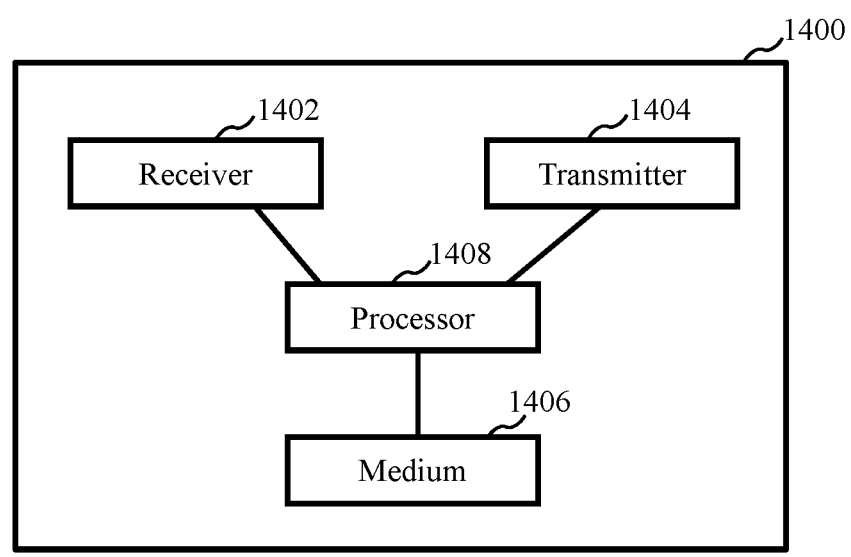
FIG. 14 illustrates an exemplary block diagram of an apparatus according to some embodiments of the present disclosure.

FIG. 14 illustrates an exemplary block diagram of an apparatus 1400 according to some embodiments of the present disclosure. In some embodiments of the present disclosure, the apparatus 600 may be a UE, which can at least perform the method illustrated in FIG. 12.

As shown in FIG. 14, the apparatus 1400 may include a receiver 1402, a transmitter 1404, a non-transitory computer-readable medium 1406, and a processor 1408 coupled to the receiver 1402, the transmitter 1404, and the non-transitory computer-readable medium 1406.

Although in FIG. 14, elements such as receiver 1402, transmitter 1404, non-transitory computer-readable medium 1406, and processor 1408 are described in the singular, the plural is contemplated unless limitation to the singular is explicitly stated. In some embodiments of the present disclosure, the receiver 1402 and the transmitter 1404 are combined into a single device, such as a transceiver. In certain embodiments of the present disclosure, the apparatus 1400 may further include an input device, a memory, and/or other components.

In some embodiments of the present disclosure, the non-transitory computer-readable medium 1406 may have stored thereon computer-executable instructions which are programmed to implement the steps of the methods, for example as described in view of FIG. 12, with the receiver 1402, the transmitter 1404, and the processor 1408. For example, the receiver 1402 receives, from a base station, one or more signals allocating a plurality of PUSCHs for transmitting uplink data, wherein the plurality of PUSCHs are contiguous in time domain; the processor 1408 divides the plurality of PUSCHs into a first set of PUSCHs and a second set of PUSCHs, and further divides the uplink data into a first part of the uplink data and a second part of the uplink data, wherein, the first set of PUSCHs is used for transmitting the first part of the uplink data and the second set of PUSCHs is used for transmitting the second part of the uplink data; and the processor 1408 performs at least one channel access procedure for transmitting the first part of the uplink data using the first set of PUSCHs and the second part of the uplink data using the second set of PUSCHs.

Figure 15:
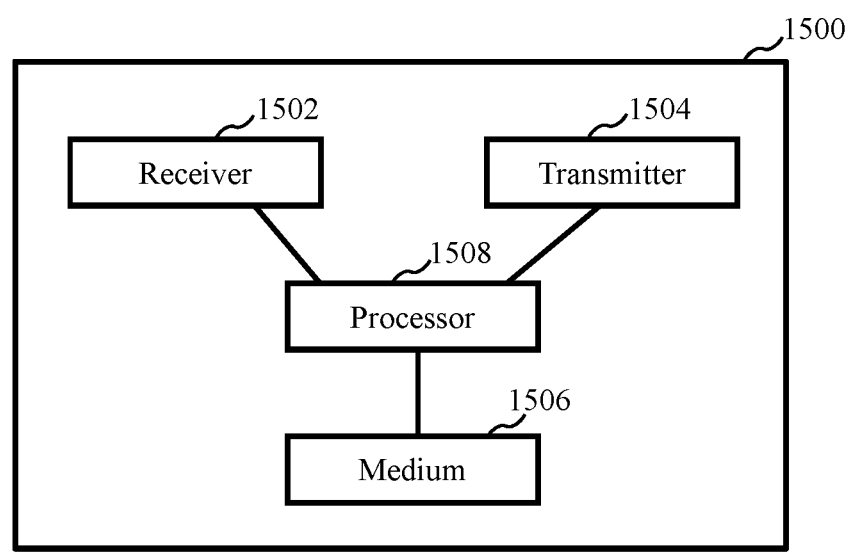
FIG. 15 illustrates an exemplary block diagram of an apparatus according to some other embodiments of the present disclosure.

FIG. 15 illustrates an exemplary block diagram of an apparatus 1500 according to some embodiments of the present disclosure. In some embodiments of the present disclosure, the apparatus 1500 may be a BS, which can at least perform the method illustrated in FIG. 13.

As shown in FIG. 15, the apparatus 1500 may include a receiver 1502, a transmitter 1504, a non-transitory computer-readable medium 1506, and a processor 1508 coupled to the receiver 1502, the transmitter 1504, and the non-transitory computer-readable medium 1506.

Although in FIG. 15, elements such as receiver 1502, transmitter 1504, non-transitory computer-readable medium 1506, and processor 1508 are described in the singular, the plural is contemplated unless limitation to the singular is explicitly stated. In some embodiments of the present disclosure, the receiver 1502 and the transmitter 1504 are combined into a single device, such as a transceiver. In certain embodiments of the present disclosure, the apparatus 1500 may further include an input device, a memory, and/or other components.

In some embodiments of the present disclosure, the non-transitory computer-readable medium 1506 may have stored thereon computer-executable instructions which are programmed to implement the steps of the methods, for example as described in view of FIG. 13, with the receiver 1502, the transmitter 1504, and the processor 1508. For example, the transmitter 1504 transmits, to a UE, one or more signals allocating a plurality of PUSCHs for transmitting uplink data, wherein the plurality of PUSCHs are contiguous in time domain; and the receiver 1502 receives a first part of the uplink data on a first set of PUSCHs and a second part of the uplink data on a second set of PUSCHs, wherein, the plurality of PUSCHs comprise the first set of PUSCHs and the second set of PUSCHs, and the uplink data comprises the first part of the uplink data and the second part of the uplink data.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this disclosure, relational terms such as "first," "second," and the like may be used solely to distinguish one entity or action from another entity or action without necessarily requiring or implying any actual such relationship or order between such entities or actions, unless specifically described. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

The invention claimed is:

1. A method performed by a user equipment (UE), the method comprising:
   receiving, from a base station (BS), one or more signals allocating a plurality of physical uplink shared channels (PUSCHs) for transmitting uplink data, wherein the plurality of PUSCHs are contiguous in time domain;
   dividing the plurality of PUSCHs into a first set of PUSCHs and a second set of PUSCHs;
   dividing the uplink data into a first part of the uplink data and a second part of the uplink data, wherein:
      the first set of PUSCHs is used to transmit the first part of the uplink data and the second set of PUSCHs is used to transmit the second part of the uplink data; and
      the first set of PUSCHs is within a channel occupancy time (COT) initiated by the BS and the second set of PUSCHs is outside of the COT; and
   performing at least one channel access procedure to transmit the first part of the uplink data using the first set of PUSCHs and the second part of the uplink data using the second set of PUSCHs.

2. A user equipment (UE) for wireless communication, comprising:
   at least one memory; and
   at least one processor coupled with the at least one memory and configured to cause the UE to:
      receive, from a base station (BS), one or more signals allocating a plurality of physical uplink shared channels (PUSCHs) for transmitting uplink data, wherein the plurality of PUSCHs are contiguous in time domain;
      divide the plurality of PUSCHs into a first set of PUSCHs and a second set of PUSCHs;
      divide the uplink data into a first part of the uplink data and a second part of the uplink data, wherein:
         the first set of PUSCHs is used to transmit the first part of the uplink data and the second set of PUSCHs is used to transmit the second part of the uplink data; and
         the first set of PUSCHs is within a channel occupancy time (COT) initiated by the BS and the second set of PUSCHs is outside of the COT; and
      perform at least one channel access procedure to transmit the first part of the uplink data using the first set of PUSCHs and the second part of the uplink data using the second set of PUSCHs.

3. A base station (BS) for wireless communication, comprising:
   at least one memory; and
   at least one processor coupled with the at least one memory and configured to cause the BS to:
      transmit, to a user equipment (UE), one or more signals allocating a plurality of physical uplink shared channels (PUSCHs) for transmitting uplink data, wherein the plurality of PUSCHs are contiguous in time domain; and
      receive a first part of the uplink data on a first set of PUSCHs and a second part of the uplink data on a second set of PUSCHs, wherein:
         the plurality of PUSCHs comprise the first set of PUSCHs and the second set of PUSCHs;
         the uplink data comprises the first part of the uplink data and the second part of the uplink data; and
         the first set of PUSCHs is within a channel occupancy time (COT) initiated by the BS and the second set of PUSCHs is outside of the COT.

4. The UE of claim 2, wherein the at least one processor is further configured to cause the UE to:
   determine a first channel access priority class (CAPC) value used to initiate the COT initiated by the BS;
   determine a second CAPC value based at least in part on the uplink data; and
   compare the second CAPC value to the first CAPC value.

5. The UE of claim 4, wherein the second CAPC value is a highest CAPC value determined based at least in part on both the first part of the uplink data and the second part of the uplink data, or based at least in part on the first part of the uplink data.

6. The UE of claim 4, wherein to perform the at least one channel access procedure, the at least one processor is configured to cause the UE to:
   perform a Type-2 channel access procedure to transmit the first part of the uplink data using the first set of PUSCHs based at least in part on the second CAPC value being smaller than or equal to the first CAPC value;
   transmit, based at least in part on the Type-2 channel access procedure being successful, the first part of the uplink data using the first set of PUSCHs;
   puncture one or more last symbols of the first set of PUSCHs for to perform a Type-1 channel access procedure to transmit the second part of the uplink data using the second set of PUSCHs; and perform the Type-1 channel access procedure before transmitting the second part of the uplink data using the second set of PUSCHs.

7. The UE of claim 4, wherein the at least one processor is further configured to cause the UE to:

suspend, based at least in part on the second CAPC value being larger than the first CAPC value, transmission of the first part of the uplink data using the first set of PUSCHs, and wherein to perform the at least one channel access procedure, the at least on processor is configured to cause the UE to:

perform a Type-1 channel access procedure to transmit the second part of the uplink data using the second set of PUSCHs before a starting position of the second set of PUSCHs.

8. The UE of claim 4, wherein the at least one processor is further configured to cause the UE to:

determine whether any portion of the first part of the uplink data has a corresponding CAPC value not larger than the first CAPC value; and skip transmission of the first set of PUSCHs based at least in part on no portion of the first part of the uplink data having the corresponding CAPC value not larger than the first CAPC value, wherein to perform the at least one channel access procedure, the at least on processor is configured to cause the UE to:

perform a Type-1 channel access procedure to transmit the second part of the uplink data using the second set of PUSCHs before a starting position of the second set of PUSCHs;

perform, based at least in part on at least one portion of the first part of the uplink data having the corresponding CAPC value not larger than the first CAPC value, a Type-2 channel access procedure to transmit the at least one portion of the first part of the uplink data;

puncture one or more last symbols of the first set of PUSCHs to perform the Type-1 channel access procedure to transmit the second part of the uplink data using the second set of PUSCHs; and perform the Type-1 channel access procedure.

9. The UE of claim 4, wherein the at least one processor is further configured to cause the UE to:

perform, based at least in part on the second CAPC value being larger than the first CAPC value, a Type-1 channel access procedure to transmit both the first part of the uplink data using the first set of PUSCHs and the second part of the uplink data using the second set of PUSCHs.

10. The UE of claim 2, wherein the first set of PUSCHs is allocated by a first signal of the one or more signals, the second set of PUSCHs is allocated by a second signal of the one or more signals, and the first signal is received by the UE earlier than the second signal.

11. The UE of claim 10, wherein the at least one processor is further configured to cause the UE to:

determine a type of channel access procedure indicated in the second signal is different from an additional type of channel access procedure indicated in the first signal, wherein to perform the at least one channel access procedure, the at least on processor is configured to cause the UE to:

perform the additional type of channel access procedure to transmit both the first part of the uplink data using the first set of PUSCHs and the second part of the uplink data using the second set of PUSCHs.

12. The UE of claim 10, wherein the at least one processor is further configured to cause the UE to:

determine a type of channel access procedure indicated in the second signal is different from an additional type of channel access procedure indicated in the first signal, wherein to perform the at least one channel access procedure, the at least on processor is configured to cause the UE to:

perform the type of channel access; and continue transmission of the second part of the uplink data on the second set of PUSCHs after completing transmission of the first part of the uplink data on the first set of PUSCHs.

13. The UE of claim 10, wherein the at least one processor is further configured to cause the UE to:

determine a type of channel access procedure indicated in the second signal is different from an additional type of channel access procedure indicated in the first signal, wherein to perform the at least one channel access procedure, the at least on processor is configured to cause the UE to:

perform the type of channel access procedure to transmit the first part of the uplink data on the first set of PUSCHs; and puncture one or two last symbols in the first set of PUSCHs to perform the additional type of channel access procedure.

14. The UE of claim 10, wherein the at least one processor is further configured to cause the UE to:

determine a CAPC value indicated in the second signal is different from an additional CAPC value indicated in the first signal, wherein to perform the at least one channel access procedure, the at least on processor is configured to cause the UE to:

perform a channel access procedure using a maximum CAPC value of the additional CAPC value and the CAPC value.

15. The UE of claim 10, wherein the at least one processor is further configured to cause the UE to:

determine a CAPC value indicated in the second signal is different from an additional CAPC value indicated in the first signal, wherein to perform the at least one channel access procedure, the at least on processor is configured to cause the UE to:

perform a channel access procedure using the CAPC value to transmit both the first part of the uplink data and the second part of the uplink data on the plurality of PUSCHs;

transmit, based at least in part on a maximum COT (MCOT) corresponding to the CAPC value not being sufficiently long to accommodate both the first set of PUSCHs and the second set of PUSCHs, the uplink data using the PUSCHs accommodated in the MCOT; and generate a gap within a last PUSCH in the MCOT to perform the channel access procedure to transmit a remaining part of the uplink data using remaining PUSCHs of the plurality of PUSCHs.

16. The UE of claim 10, wherein the at least one processor is further configured to cause the UE to:

determine a CAPC value indicated in the second signal is different from an additional CAPC value indicated in the first signal, wherein to perform the at least one channel access procedure, the at least one processor is configured to cause the UE to:

perform, based at least in part on a maximum COT (MCOT) corresponding to the CAPC value being sufficiently long to accommodate both the first set of PUSCHs and the second set of PUSCHs, a channel access procedure using the CAPC value to transmit both the first part of the uplink data using the first set of PUSCHs and the second part of the uplink data using the second set of PUSCHs; and perform, based at least in part on the MCOT not being sufficiently long to accommodate both the first set of PUSCHs and the second set of PUSCHs, the channel access procedure using the additional CAPC value to transmit both the first part of the uplink data using the first set of PUSCHs and the second part of the uplink data using the second set of PUSCHs.

17. The UE of claim 10, wherein the at least one processor is further configured to cause the UE to:

skip transmission of a remaining PUSCHs in the first set of PUSCHs based at least in part on transmission of the first part of the uplink data being completed before a last PUSCH in the first set of PUSCHs, wherein to perform the at least one channel access procedure, the at least on processor is configured to cause the UE to:

perform a Type-2 channel access procedure to transmit the second part of the uplink data using the second set of PUSCHs.

18. The UE of claim 10, wherein the at least one processor is further configured to cause the UE to:

determine a downlink duration indicated in the second signal longer than an additional downlink duration indicated in the first signal, wherein the downlink duration and the additional downlink duration are for downlink transmission in a COT initiated by the UE;

shorten uplink transmission in the COT initiated by the UE; and share a remaining time in the COT initiated by the UE based at least in part on the additional downlink duration.

19. The UE of claim 2, wherein to perform the at least one channel access procedure, the at least one processor is configured to cause the UE to:

perform, based at least in part on at least one PUSCH of the plurality of PUSCHs being outside of the COT, a Type-1 channel access procedure to transmit both the first part of the uplink data using the first set of PUSCHs and the second part of the uplink data using the second set of PUSCHs.

20. A processor for wireless communication, comprising:

at least one controller coupled with at least one memory and configured to cause the processor to:

receive, from a base station (BS), one or more signals allocating a plurality of physical uplink shared channels (PUSCHs) for transmitting uplink data, wherein the plurality of PUSCHs are contiguous in time domain;

divide the plurality of PUSCHs into a first set of PUSCHs and a second set of PUSCHs;

divide the uplink data into a first part of the uplink data and a second part of the uplink data, wherein:

the first set of PUSCHs is used to transmit the first part of the uplink data and the second set of PUSCHs is used to transmit the second part of the uplink data; and the first set of PUSCHs is within a channel occupancy time (COT) initiated by the BS and the second set of PUSCHs is outside of the COT; and perform at least one channel access procedure to transmit the first part of the uplink data using the first set of PUSCHs and the second part of the uplink data using the second set of PUSCHs.

* * * * *